(12) United States Patent
Bu (10) Patent No.: US 11,308,725 B2
(45) Date of Patent: Apr. 19, 2022

(54) TOUCH DISPLAY DEVICE

(71) Applicant: WUHAN CHINA STAR OPTOELECTRONICS TECHNOLOGY CO., LTD., Hubei (CN)

(72) Inventor: Huanhuan Bu, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 405 days.

(21) Appl. No.: 16/481,114

(22) PCT Filed: Apr. 25, 2019

(86) PCT No.: PCT/CN2019/084274
§ 371 (c)(1),
(2) Date: Jul. 26, 2019

(87) PCT Pub. No.: WO2020/107791
PCT Pub. Date: Jun. 4, 2020

(65) Prior Publication Data
US 2021/0357610 A1    Nov. 18, 2021

(30) Foreign Application Priority Data

Nov. 30, 2018 (CN) .......................... 201811452719.3

(51) Int. Cl.
*G06V 40/13* (2022.01)
*G06F 3/041* (2006.01)

(52) U.S. Cl.
CPC ........ *G06V 40/1318* (2022.01); *G06F 3/0412* (2013.01)

(58) Field of Classification Search
None
See application file for complete search history.

(56) References Cited

U.S. PATENT DOCUMENTS

| 2017/0228575 | A1* | 8/2017 | Shin ................... G06K 9/00046 |
| 2018/0150671 | A1 | 5/2018 | Choo et al. |
| 2018/0357459 | A1* | 12/2018 | Ling .................. G06K 9/00053 |
| 2019/0026527 | A1* | 1/2019 | He ....................... G06K 9/0004 |
| 2019/0187513 | A1 | 6/2019 | Jin et al. |
| 2019/0220124 | A1* | 7/2019 | Tan ....................... G06F 3/0421 |
| 2020/0401281 | A1* | 12/2020 | Shu ....................... G06F 1/1694 |

FOREIGN PATENT DOCUMENTS

| CN | 107122080 A | 9/2017 |
| CN | 107220622 A | 9/2017 |
| CN | 107423691 A | 12/2017 |
| CN | 107886037 A | 4/2018 |
| CN | 108182881 A | 6/2018 |
| CN | 108614982 A | 10/2018 |

* cited by examiner

*Primary Examiner* — Joseph R Haley (57) ABSTRACT

A touch display device, including a protective layer, a display module, a touch layer, a fingerprint sensor layer, a backlight, and a shading layer. The fingerprint sensor layer and the touch layer are stacked together in the display area of the display device. By integrating the fingerprint sensor layer and the touch layer, the fingerprint recognition function can be realized while implementing the touch display, which not only reduces the production process, reduces the production cost, but also reduces the overall thickness of the display device.

16 Claims, 5 Drawing Sheets

TOUCH DISPLAY DEVICE

FIELD OF INVENTION

The present invention relates to a field of display technologies, and in particular, to a touch display device with high performance fingerprint recognition function.

BACKGROUND OF INVENTION

At present, mobile electronic devices have developed a method of identifying personal fingerprints for identity authentication, thereby improving the security of mobile devices. The fingerprint imaging recognition technology is a technique of acquiring a fingerprint image of a human body through a fingerprint sensor and then comparing it with current fingerprint imaged information in the system to determine whether the fingerprint information matches, thereby realizing identity recognition technology. Implementation of fingerprint recognition technology includes optical imaging, capacitive imaging, ultrasonic imaging, and other technologies. Relatively speaking, optical fingerprint imaging technology has good imaging effect relatively and relatively lower equipment cost.

However, current fingerprint identification modules are an accessory that is separately installed in the display device, which not only increases manufacturing cost of the display device, but also occupies a certain space of the display device, which is not conducive to development of light and thin display devices.

SUMMARY OF INVENTION

The present invention provides a touch display device to solve the technical problems of disadvantageous for a development of display device to be lightweight and thinner caused by the current touch display device that has the fingerprint recognition module separately provided, which the process and cost are increased, and a thickness of the display device is also increased.

In order to solve the above problem, the present invention provides technical solutions as follows.

The invention provides a touch display device, touch display device defines a display area and a non-display area disposed around the display area, including: a protective layer; a display module disposed under the protective layer; a touch layer disposed under the protective layer; a fingerprint sensor layer disposed at a side of the touch layer; a backlight disposed under the protective layer and located corresponding to the non-display area, wherein the backlight comprises a plurality of even-numbered dot backlights uniformly distributed around the fingerprint sensor layer, and an included angle between light emitted from the backlight and a first surface of the protective layer is an acute angle; a shading layer disposed between a side of the fingerprint sensor layer and the backlight; and a flexible circuit board and a driver chip disposed in the non-display area, wherein a plurality of signal lines disposed on the fingerprint sensor layer and the touch layer are connected to the driver chip through the flexible circuit board; wherein the fingerprint sensor layer and the touch layer are stacked together in the display area.

In at least one embodiment of the invention, a portion of the first surface of the protective layer corresponding to the backlight is provided with a brightness enhancement film.

In at least one embodiment of the invention, a light-concentration layer is disposed at a side of the backlight near the protective layer.

In at least one embodiment of the invention, a touch layer is disposed between the display module and the protective layer.

In at least one embodiment of the invention, a fingerprint sensor layer is disposed between the display module and the touch layer, and the fingerprint sensor layer is attached to the display module through a first adhesive layer.

In at least one embodiment of the invention, a fingerprint sensor layer is disposed between the protective layer and the touch layer, the fingerprint sensor layer is attached to the protective layer by a second adhesive layer, and a refractive index of the second adhesive layer and a refractive index of the protective layer are same.

The invention further provides a touch display device, which defines a display area and a non-display area disposed around the display area, including: a protective layer; a display module disposed under the protective layer; a touch layer disposed under the protective layer; a fingerprint sensor layer disposed at a side of the touch layer; a backlight disposed under the protective layer and located corresponding to the non-display area; a shading layer disposed between a side of the fingerprint sensor layer and the backlight; wherein the fingerprint sensor layer and the touch layer are stacked together in the display area.

In at least one embodiment of the invention, further including a flexible circuit board and a driver chip disposed in the non-display area, wherein a plurality of signal lines disposed on the fingerprint sensor layer and the touch layer are connected to the driver chip through the flexible circuit board.

In at least one embodiment of the invention, a backlight is a plurality of even-numbered dot backlights uniformly distributed around the fingerprint sensor layer.

In at least one embodiment of the invention, an included angle between light emitted from the backlight and a first surface of the protective layer is an acute angle.

In at least one embodiment of the invention, a portion of the first surface of the protective layer corresponding to the backlight is provided with a brightness enhancement film.

In at least one embodiment of the invention, a light-concentration layer is disposed at a side of the backlight near the protective layer.

In at least one embodiment of the invention, a touch layer is disposed between the display module and the protective layer.

In at least one embodiment of the invention, a fingerprint sensor layer is disposed between the display module and the touch layer, and the fingerprint sensor layer is attached to the display module through a first adhesive layer.

In at least one embodiment of the invention, a fingerprint sensor layer is disposed between the protective layer and the touch layer, and the fingerprint sensor layer is attached to the protective layer by a second adhesive layer In at least one embodiment of the invention, a refractive index of the second adhesive layer and a refractive index of the protective layer are same.

In at least one embodiment of the invention, a display module includes an array substrate and a color film substrate disposed opposite to each other, and a liquid crystal layer encapsulated between the array substrate and the color film substrate.

In at least one embodiment of the invention, a touch layer is disposed between the array substrate and the liquid crystal layer.

In at least one embodiment of the invention, a fingerprint sensor layer is disposed between the touch layer and the liquid crystal layer.

In at least one embodiment of the invention, a display module is attached to the protective layer through a third adhesive layer, and a refractive index of the third adhesive layer and a refractive index of the protective layer are same.

The invention has the beneficial effects that the touch display device provided by the invention integrates the fingerprint sensor layer and the touch layer, and realizes the fingerprint recognition function while realizing the touch display. It not only reduces the production process, reduces the production cost, but also improves the accuracy of fingerprint recognition. In addition, it also reduces the overall thickness of the display device, thereby improving the user's experience.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

The present invention is directed to the current touch display device. In the current touch display device, the fingerprint recognition module is an accessory separately disposed, which increases the process and cost, and also increases the thickness of the display device, and is not conductive to the development of lightweight and thinner of the display device, the present embodiment can solve the drawback.

The present invention provides a touch display device. The display device which defines a display area and a non-display area disposed around the display area. The display area is used to implement a fingerprint recognition function, a touch function, and a display function. The non-display area is used to accommodate metal traces and other devices.

The display device includes a protective layer, a display module, a touch layer, a fingerprint sensor layer, a backlight, and a shading layer.

The display module, the touch layer, and the fingerprint sensor layer are all disposed under the protective layer.

The backlight is disposed under the protective layer and is located corresponding to the non-display area, and the backlight is two or more even-numbered dot light sources uniformly distributed around the fingerprint sensor layer, the light source is an LED light lamp, and light from the LED lamp can be blue, red or near-infrared.

The shading layer is disposed at a side of the display area. Specifically, the shading layer is disposed between the fingerprint sensor layer and a side of the touch layer, and used to prevent the light emitted from the backlight enters the protective layer through a side of the touch layer and the fingerprint sensor layer, which leads the light to be refracted by different media, and causing ghosting phenomenon when the fingerprint image is collected.

The touch display device further includes a flexible circuit board and a driver chip disposed in the non-display area, wherein a plurality of signal lines disposed on the fingerprint sensor layer and the touch layer are connected to the driver chip through the flexible circuit board. The fingerprint sensor layer and the touch layer are stacked together in the display area.

The fingerprint sensor layer and the contact layer are disposed in the display area, and the touch layer is one of an external type, a built-in type, and an integrated type according to different installation manners of the touch layer, and the detail descriptions are combined with the following specific embodiments.

Embodiment 1

Figure 1:
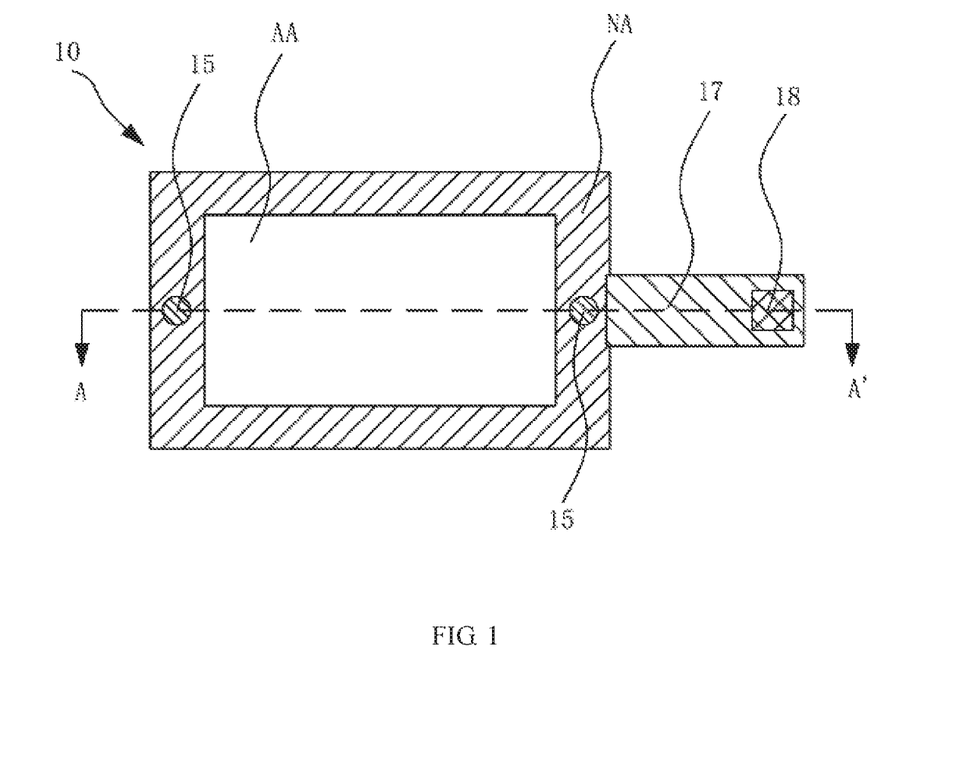
FIG. 1 is a top view of a touch display device according to an embodiment 1 of the present invention.
Figure 2:
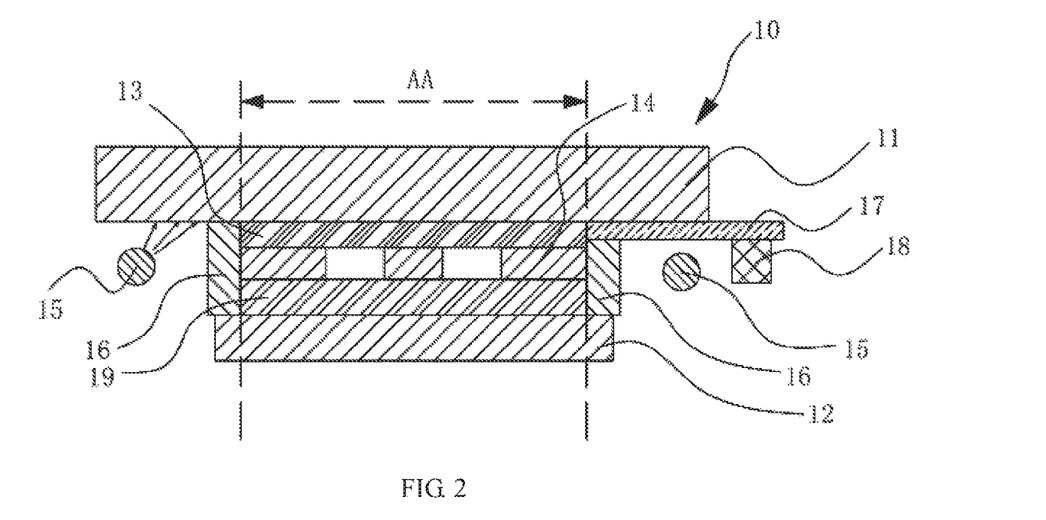
FIG. 2 is a schematic structural view showing the cross-section of a line AA' in FIG. 1.

Please referring to FIG. 1 and FIG. 2, FIG. 1 is a top view of the present embodiment and FIG. 2 is a schematic structural view showing the cross-section of a line AA' in FIG. 1. The present invention provides a touch display device 10, on which the display area AA and the non-display area NA are defined, and the non-display area NA is disposed around the display area AA.

The touch display device 10 includes a protective layer 11, a display module 12, a touch layer 13, a fingerprint sensor layer 14, a backlight 15, a shading layer 16, and a first adhesive layer 19.

The protective layer 11 is a light transmissive substrate, such as a glass substrate, the protective layer 11 has opposite a first and a second surfaces, and the second surface is used for fingerprint contact of a human finger.

The touch layer 13 is disposed between the protective layer 11 and the display module 12, the fingerprint sensor layer 14 is disposed between the touch layer 13 and the display module 12, and the touch layer 13 and the fingerprint sensor layer 14 are both disposed in the display area AA.

The touch layer 13 of the present embodiment is a structure of the external type, that is, OGS, GG, GF, GG, and the like. The touch layer 13 of the present embodiment is described by an OGS structure. A pattern of the touch layer 13 is directly formed on the second surface of the protective layer 11, and the fingerprint sensor layer 14 is formed on the surface of the touch layer 13 away from a side of the protective layer 11. The fingerprint sensor layer 14 and the touch layer 13 shares the same substrate, which can reduce the overall thickness of the display device by 0.2 to 0.4 mm.

A first adhesive layer 19 is disposed between the fingerprint sensor layer 14 and the display module 12. Since the protective layer 11, the touch layer 13, and the fingerprint sensor layer 14 are integrated, the first adhesive layer 19 needs to be attached to the fingerprint sensor layer 14 and the display module 12. The first adhesive layer 19 can be a thermosensitive optical adhesive layer, a photosensitive optical adhesive layer or an optical double-sided tape.

A photosensitive pixel area is disposed on the optical fingerprint sensor layer 14, and the photosensitive pixel area is disposed in the display area AA. The photosensitive pixel area includes a plurality of pixels arranged in a matrix of rows and columns, a plurality of data lines and a plurality of scan lines are correspondly disposed between the rows and columns of the pixels, and the plurality of data lines and the plurality of scan lines are arranged at a cross-arrangement. Specifically, the plurality of the data lines are arranged along a first axial direction, and the plurality of the data lines are arranged along a second axial direction, and the first axial direction is perpendicular to the second axial direction. The scan lines and the data lines define a plurality of grids, each grid corresponding to one pixel, each of the pixels can be square, and each side of the grid is less than or equal to 100 micrometers.

The touch display device 10 further includes a flexible circuit board 17 and a driver chip 18 disposed in the non-display area NA. The flexible circuit board 17 is disposed at a side of the touch layer 13, and the driver chip 18 is connected to the flexible circuit board. The signal layer (such as the data line and the scan line) of the touch layer 13 and the optical fingerprint sensor are connected to the driver chip 18 through the flexible circuit board 17, that is, the touch function and the fingerprint recognition function are integrated in the same chip, which can be operated in a time-sharing manner.

The backlight 15 is disposed under the protective layer 11 and is located corresponding to the non-display area NA, and the backlight 15 is two or more even-numbered dot backlights uniformly distributed around the fingerprint sensor layer 14. The backlight 15 is disposed at a distance from the protective layer 11 in a vertical direction, and the backlight 15 is disposed at a distance from the optical fingerprint sensor layer 14 in a horizontal direction. By adjusting the backlight 15 to a suitable position, the sharpness of the fingerprint image is improved.

An included angle between light emitted from the backlight 15 and a first surface of the protective layer 11 (the surface closed to a side of the display module 12) is an acute angle.

The shading layer 16 is disposed between the backlight 15 and a side of the fingerprint sensor layer. The shading layer 16 is disposed in the non-display area NA and is adjacent to the display area AA. The shading layer 16 is used to prevent incident light entering into the protective layer 11 through the sides of the touch layer 13 and the fingerprint sensor layer 14. Since the light is refracted by the medium and then reflected into the second surface of the protective layer 11, it is easy to occur phenomenon of ghosting during fingerprint image acquisition, which in turn causes the fingerprint image to be unclear.

Further, the surface of the shading layer 16 away from facing the display module 12 should be not lower than the surface of the touch layer 13 away from facing the display module 12, thereby improving the shading effect. The refractive index of the material selected for the touch layer 13 is the same as the refractive index of the protective layer 11, and the refractive index is within a tolerance of 5%.

Embodiment 2

Figure 3:
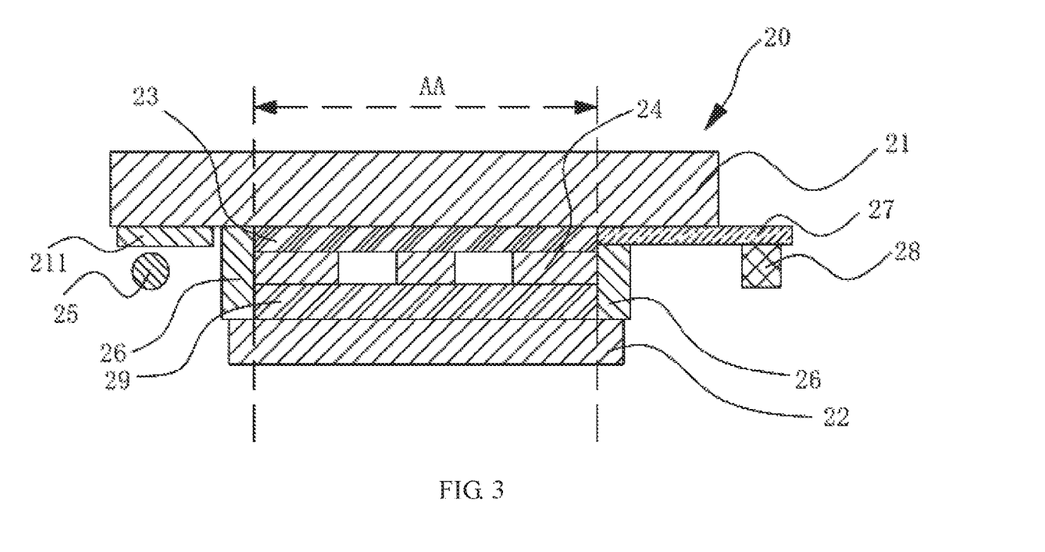
FIG. 3 is a schematic structural diagram of a touch display device according to an embodiment 2 of the present invention.

As shown in FIG. 3, the present embodiment provides a touch display device 20 including a protective layer 21, a display module 22, a touch layer 23, a fingerprint sensor layer 24, a backlight 25, a shading layer 26, a flexible circuit board 27, a driver chip 28, and a first adhesive layer 29.

The above structure is the same as or similar to that of the embodiment 1, the description of the related structure can refer to the embodiment 1, and details are not described herein again.

Different from the embodiment 1, the touch display device 20 of the present embodiment further includes a brightness enhancement film 211. The brightness enhancement film 211 is disposed on a portion of the first surface of the protective layer 21 corresponding to the backlight 25. The brightness enhancement layer facilitates light propagation, so that the light emitted by the backlight is more applied to fingerprint image acquisition, and the utilization of the backlight is improved.

Embodiment 3

Figure 4:
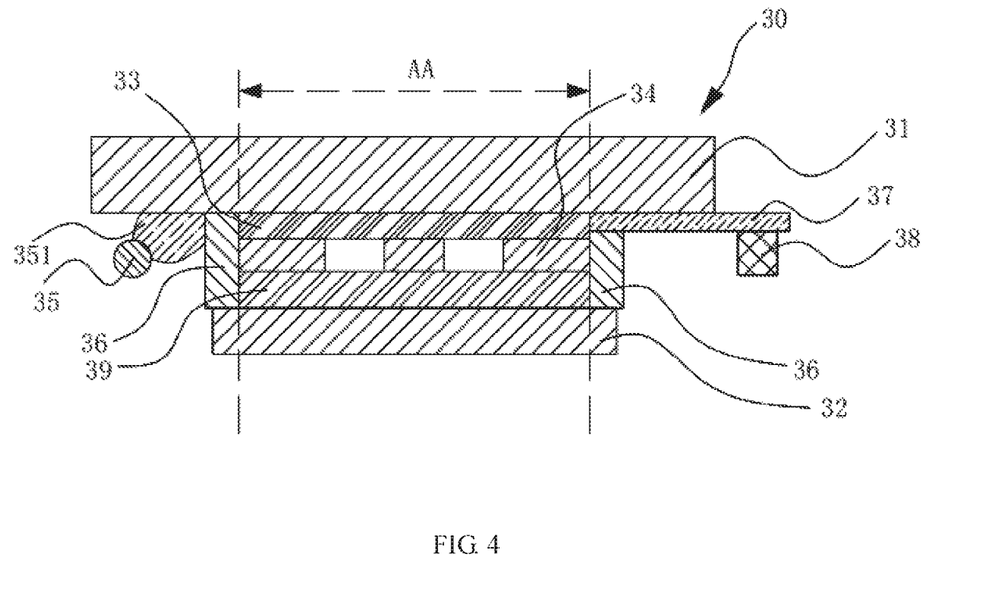
FIG. 4 is a schematic structural diagram of a touch display device according to an embodiment 3 of the present invention.

As shown in FIG. 4, the embodiment provides a touch display device 30, which includes a protective layer 31, a display module 32, a touch layer 33, a fingerprint sensor layer 34, a backlight 35, a shading layer 36, a flexible circuit board 37, a driver chip 38, and a first adhesive layer 39.

The above structure is the same as or similar to that of the embodiment 1, the description of the related structure can refer to the embodiment 1, and details are not described herein again.

Different from the embodiment 1, the touch display device 30 of the present embodiment further includes a light-concentration layer 351 disposed on a side of the backlight 35 adjacent to the protective layer 31. A glue or glue material with a large refractive index and a high transmittance can be added to the surface of the backlight 35, so that more light emitted from the light sources can be applied to fingerprint image acquisition, which is advantageous for obtaining a better fingerprint image.

Embodiment 4

Figure 5:
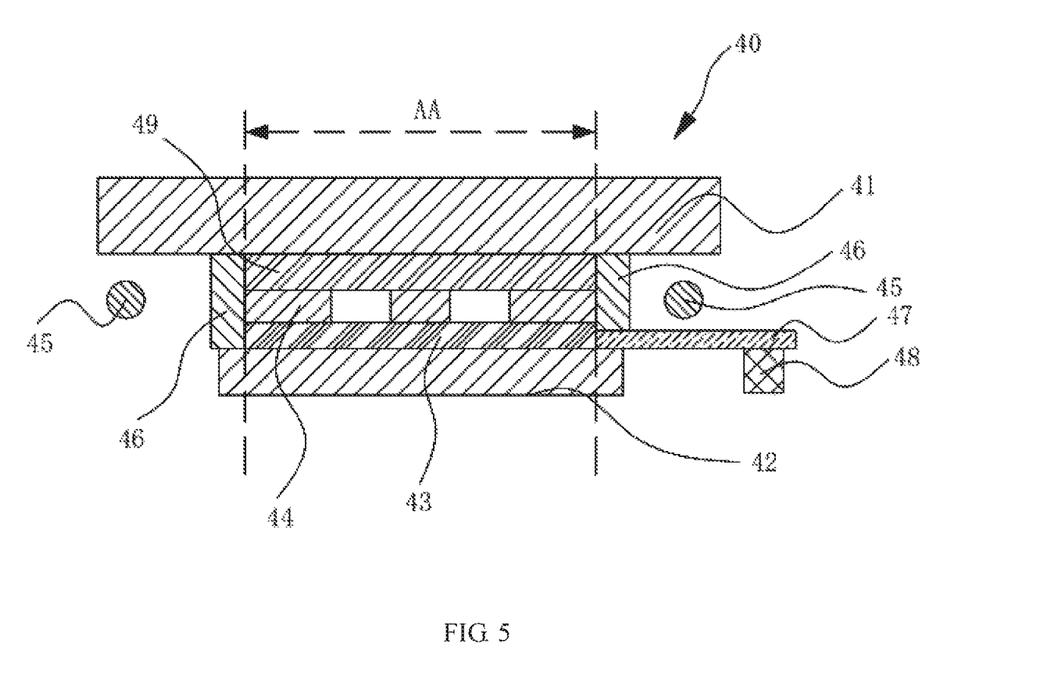
FIG. 5 is a schematic structural diagram of a touch display device according to an embodiment 4 of the present invention.

As shown in FIG. 5, the touch display device 40 is provided, which defines a display area AA and a non-display area disposed around the display area AA. The touch display device 40 includes a protective layer 41 and a display module 42, a touch layer 43, a fingerprint sensor layer 44, a backlight 45, a shading layer 46, a flexible circuit board 47, a driver chip 48, and a second adhesive layer 49.

The touch layer 43 is disposed between the protective layer 41 and the display module 42. The fingerprint sensor layer 14 is disposed between the protective layer 41 and the touch layer 43. The touch layer 43 and the fingerprint sensor layer 44 are all disposed within the display area AA.

The touch layer 43 in this embodiment is an on-cell structure, and the display module includes a color film substrate and an array substrate disposed opposite to each other. The touch layer 43 is formed on a surface of the color film substrate facing away a side of the array substrate, and the fingerprint sensor layer 44 is formed on a surface of the touch layer 43 facing away from a side of the color film substrate.

When the touch layer 43 is a single-sided ITO electrode structure, the optical fingerprint sensor layer 44 is disposed above the color film substrate, and when the touch layer 43 is a double-sided ITO electrode structure, the optical fingerprint sensor layer 44 is disposed above or below the color film substrate. The touch layer 43 in this embodiment is a single-sided ITO electrode structure.

In other embodiments, the touch layer 43 can be a double-sided ITO electrode structure, when the optical fingerprint sensor layer 44 is located under the color film substrate, the refractive index of the optical film substrate material is the same as the refractive index of the protective layer 41, and the refractive index is within a tolerance of 5%.

A second adhesive layer 49 is disposed between the fingerprint sensor layer 44 and the protective layer 41. The adhesive layer is used to attached the fingerprint sensor layer 44 and the protective layer 41. The second adhesive layer 49 can be a thermosensitive optical adhesive layer, a photosensitive optical adhesive layer or an optical double-sided tape. The refractive index of the second adhesive layer 49 is the same as the refractive index of the protective layer 41 and the refractive index is within a tolerance of 5%, whereby prevents a refraction of light through different layers of the medium which a ghosting phenomenon is generated and results with unclear fingerprint images during fingerprint image acquisition.

In other embodiments, a brightness enhancement film can be disposed on a surface of the protective layer 41 closed to a side of the backlight 45. The brightness enhancement film is disposed corresponding to the backlight; or a light-concentration layer is disposed on a side of the backlight 45 closed to the protective layer 41. The light-concentration layer functions similarly to the brightness enhancement film, which facilitates the propagation of the light of the backlight 45, improves the utilization of light, and obtains a clearer fingerprint image.

Other structures are the same as or similar to those of the embodiment 1, and are not described herein again.

Embodiment 5

Figure 6:
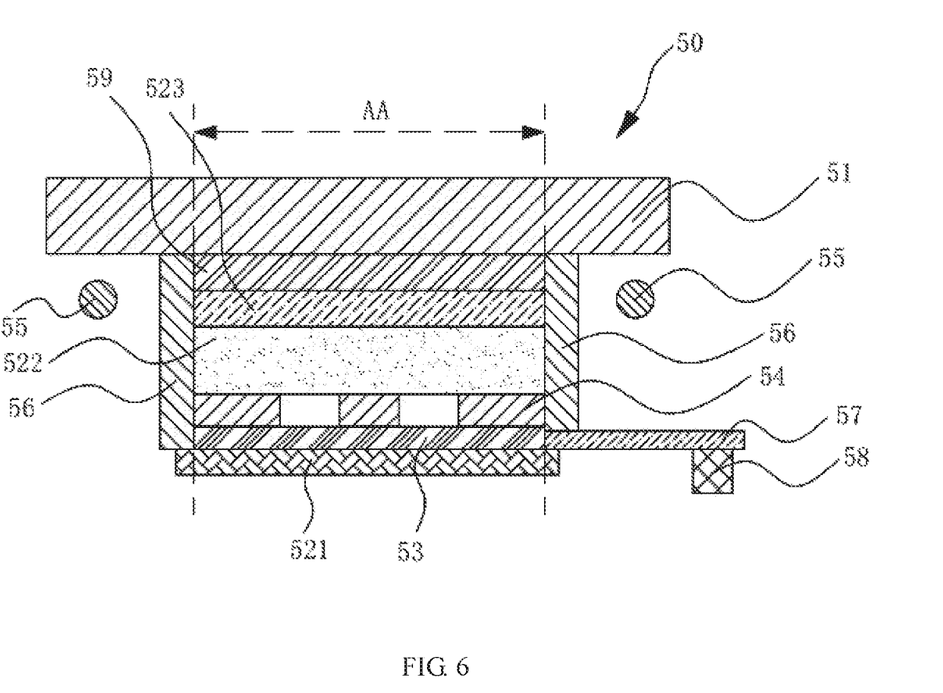
FIG. 6 is a schematic structural diagram of a touch display device according to an embodiment 5 of the present invention.

As shown in FIG. 6, the embodiment provides a touch display device 50, which includes a protective layer 51, a display module, a touch layer 53, a fingerprint sensor layer 54, a backlight 55, a shading layer 56, a flexible circuit board 57, a driver chip 58, and a third adhesive layer 59.

The display module includes an array substrate 521 and a color film substrate 523 disposed opposite to each other, and a liquid crystal layer 522 encapsulated between the array substrate 521 and the color film substrate 523.

The touch layer 53 is disposed between the liquid crystal layer 522 and the array substrate, and the fingerprint sensor layer 54 is disposed between the liquid crystal layer 522 and the touch layer 53.

The touch layer of this embodiment is a full in-cell structure, a driving electrode layer and a sensing electrode layer of the touch layer 53 are formed on surface of a side of the array substrate closed to the liquid crystal layer 522, wherein the fingerprint sensor layer 54 is formed on the touch layer 53 and then process the encapsulation of the liquid crystal.

The third adhesive layer 59 is disposed between the color film substrate 523 and the protective layer 51, and the display module is attached to the protective layer 51 through the third adhesive layer 59. The refractive index of the third adhesive layer 59 and materials of the color film substrate 523 is the same as the protective layer 51, and the refractive index is within a tolerance of 5%.

In other embodiments, the touch layer 54 can be a Hybrid in-cell structure. When a driving electrode layer of the touch layer 54 is formed on an upper surface of the array substrate 521 (a surface close to the side of the liquid crystal layer 522) and the sensing electrode layer of the touch layer 54 is formed on an upper surface of the color film substrate (a surface facing away the side of the liquid crystal layer 522), the fingerprint sensor layer 44 can be formed on the driving electrode layer or the sensing electrode layer of the touch layer 54.

Further, a brightness enhancement film can be disposed on a surface of the protective layer 51 closed to a side of the backlight 55. The brightness enhancement film is disposed corresponding to the backlight; or a light-concentration layer is disposed on a side of the backlight 55 closed to the protective layer 51. The light-concentration layer functions similarly to the brightness enhancement film, which facilitates the propagation of the light of the backlight 55, improves the utilization of light, and obtains a clearer fingerprint image.

Other structures are the same as or similar to those of the embodiment 1, and are not described herein again.

Beneficial effects: the touch display device provided by the invention integrates the fingerprint sensor layer and the touch layer, and realizes the fingerprint recognition function while realizing the touch display. It not only reduces production process, reduces production cost, but also improves fingerprint recognition accuracy. In addition, it also reduces the overall thickness of the display device, thereby improving user experience.

Embodiments of the present invention have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A touch display device which defines a display area and a non-display area disposed around the display area, comprising:
   a protective layer;
   a display module disposed under the protective layer;
   a touch layer disposed under the protective layer;
   a fingerprint sensor layer disposed at a side of the touch layer;
   a backlight disposed under the protective layer and located corresponding to the non-display area; and
   a shading layer disposed between a side of the fingerprint sensor layer and the backlight;
   wherein the fingerprint sensor layer and the touch layer are stacked together in the display area, the touch layer is disposed between the display module and the protective layer, the fingerprint sensor layer is disposed between the display module and the touch layer, and the fingerprint sensor layer is attached to the display module through a first adhesive layer.

2. The touch display device according to claim 1, wherein the backlight comprises a plurality of even-numbered dot backlights uniformly distributed around the fingerprint sensor layer.

3. The touch display device according to claim 2, wherein an included angle between light emitted from the backlight and a first surface of the protective layer is an acute angle.

4. The touch display device according to claim 1, wherein the touch display device comprises a flexible circuit board and a driver chip disposed in the non-display area.

5. The touch display device according to claim 4, wherein a plurality of signal lines disposed on the fingerprint sensor layer, and the touch layer are connected to the driver chip through the flexible circuit board.

6. A touch display device which defines a display area and a non-display area disposed around the display area, comprising:
- a protective layer;
- a display module disposed under the protective layer;
- a touch layer disposed under the protective layer;
- a fingerprint sensor layer disposed at a side of the touch layer;
- a backlight disposed under the protective layer and located corresponding to the non-display area;
- a shading layer disposed between a side of the fingerprint sensor layer and the backlight;
- wherein the fingerprint sensor layer and the touch layer are stacked together in the display area, the touch layer is disposed between the display module and the protective layer, and the fingerprint sensor layer is disposed between the protective layer and the touch layer, the fingerprint sensor layer is attached to the protective layer by an adhesive layer.

7. The touch display device according to claim 6, wherein the touch display device comprises a flexible circuit board and a driver chip disposed in the non-display area, a plurality of signal lines are disposed on the fingerprint sensor layer, and the touch layer are connected to the driver chip through the flexible circuit board.

8. The touch display device according to claim 6, wherein the backlight is a plurality of even-numbered dot backlights uniformly distributed around the fingerprint sensor layer.

9. The touch display device according to claim 8, wherein an included angle between light emitted from the backlight and a first surface of the protective layer is an acute angle.

10. The touch display device according to claim 6, wherein a refractive index of the adhesive layer and a refractive index of the protective layer are same.

11. A touch display device which defines a display area and a non-display area disposed around the display area, comprising:
- a protective layer;
- a display module disposed under the protective layer;
- a touch layer disposed under the protective layer;
- a fingerprint sensor layer disposed at a side of the touch layer;
- a backlight disposed under the protective layer and located corresponding to the non-display area;
- a shading layer disposed between a side of the fingerprint sensor layer and the backlight;
- an array substrate;
- a color film substrate disposed opposite to the array substrate; and
- a liquid crystal layer encapsulated between the array substrate and the color film substrate;
- wherein the fingerprint sensor layer and the touch layer are stacked together in the display area, the touch layer is disposed between the array substrate and the liquid crystal layer, and the fingerprint sensor layer is disposed between the touch layer and the liquid crystal layer.

12. The touch display device according to claim 11, wherein the display module is attached to the protective layer through an adhesive layer, and a refractive index of the adhesive layer and a refractive index of the protective layer are same.

13. The touch display device according to claim 11, wherein the touch display device comprises a flexible circuit board and a driver chip disposed in the non-display area.

14. The touch display device according to claim 13, wherein a plurality of signal lines disposed on the fingerprint sensor layer, and the touch layer are connected to the driver chip through the flexible circuit board.

15. The touch display device according to claim 11, wherein the backlight comprises a plurality of even-numbered dot backlights uniformly distributed around the fingerprint sensor layer.

16. The touch display device according to claim 15, wherein an included angle between light emitted from the backlight and a first surface of the protective layer is an acute angle.

* * * * *